US006175809B1

(12) United States Patent
Naville

(10) Patent No.: US 6,175,809 B1
(45) Date of Patent: Jan. 16, 2001

(54) IMMERSIBLE SEISMIC EMISSION DEVICE AND IMPLEMENTATION METHOD

(75) Inventor: Charles Naville, Vlaminck (FR)

(73) Assignee: Institut Francais du Petrole, Cedex (FR)

( * ) Notice: Under 35 U.S.C. 154(b), the term of this patent shall be extended for 0 days.

(21) Appl. No.: 09/246,843

(22) Filed: Feb. 9, 1999

(30) Foreign Application Priority Data

Feb. 9, 1998 (FR) .................................................. 98 01588

(51) Int. Cl.[7] .................................................. G01V 1/28
(52) U.S. Cl. .................................................. 702/14
(58) Field of Search .................................. 702/14, 6, 18; 367/3, 5, 6, 15, 16; 324/365

(56) References Cited

U.S. PATENT DOCUMENTS

| 3,691,516 | 9/1972 | Graham et al. | 340/8 R |
|---|---|---|---|
| 4,271,925 | 6/1981 | Burg | 181/120 |
| 4,422,164 | 12/1983 | Bowden | 367/15 |
| 5,128,906 | 7/1992 | Cole | 36/143 |
| 5,228,011 | 7/1993 | Owen | 367/147 |
| 5,662,165 | 9/1997 | Tubel et al. | 166/250 |
| 5,691,957 | 11/1997 | Spiesberger | 367/3 |

FOREIGN PATENT DOCUMENTS 2728973    7/1996    (FR) .

OTHER PUBLICATIONS

"Using Seafloor Arrays to Measure Sediment Seismoacoustic and Geotechnical Properties", by R. D. Stoll, appearing in Ocean Technologies and Opportunities in the Pacific for the 90's, Honolulu, Oct. 1–3, 1991, vol. 1, pp. 97–101 (IEEE).

"A Permanent Seismograph Array Around the Guld of California", by J.N. Brune et al, appearing in Bulletin of the Seismological Society of America, Jun. 1976, vol. 66, No. 3, pp. 969–978 (Abstract only).

Primary Examiner—Donald E. McElheny, Jr.
(74) Attorney, Agent, or Firm—Antonelli, Terry, Stout & Kraus, LLP

(57) ABSTRACT

The invention is a seismic emission device designed to be immersed at the bottom of a water body (sea, lake, etc.), and method of implementation. The device comprises at least one (and preferably several) self-contained emission units (1) immersible at the bottom of a water body, combining at least one or more seismic wave sources (8), such as air guns for example, suited to be placed in contact with the body, local energy storage (9) which supplies the device a multi-function connection cable (5) connecting each self-contained emission unit to a surface relay unit (4), a communication system (4a, 6a, Y) providing communication with a central control station (6) located for example on a drilling or production platform (3). VSP repetitive exploration operations can be carried out in a well by activating successively the various emission units and by acquiring the signals picked up by receivers $R_{1-n}$ placed in a well for example and coupled with the formation. The device can be used for oil prospecting.

25 Claims, 2 Drawing Sheets

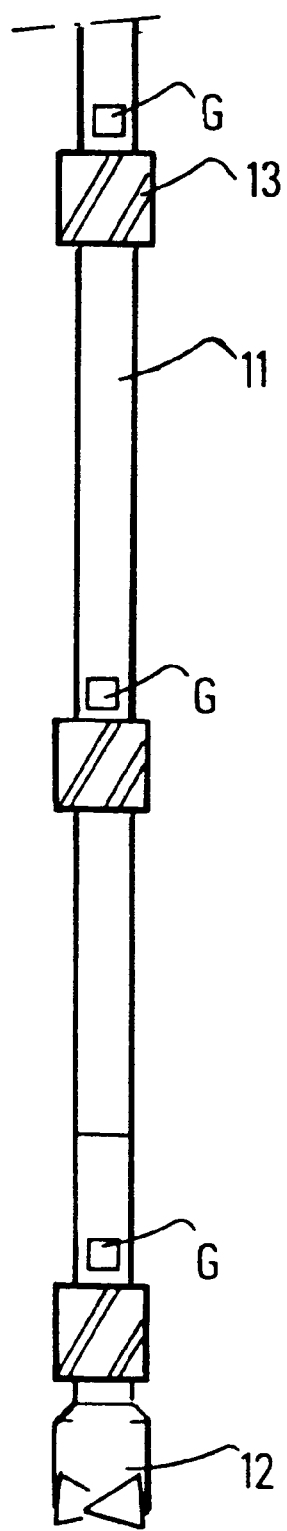

IMMERSIBLE SEISMIC EMISSION DEVICE AND IMPLEMENTATION METHOD

BACKGROUND OF THE INVENTION

1. Field of the Invention

The present invention relates to a method and to a device for carrying out operations of seismic monitoring of an underwater zone by means of elastic wave sources permanently installed against the bottom of the water mass.

2. Description of the Prior Art

During production of a reservoir, it is well-known to carry out cyclic seismic exploration operations with transmission in the formation of elastic waves, recording of the waves reflected by the subsoil discontinuities and processing of the acquired seismic data in order for example to follow the evolution of the reservoir with time.

A conventional method referred to as VSP consists in coupling the wall of a well to a string of seismic receivers placed at intervals along a conventional logging cable in order to pick up the waves reflected by the discontinuities of the surrounding formation in response to the waves emitted by a source outside the well.

In order to simplify and to accelerate these periodic seismic well exploration or monitoring sessions which require drilling operation interruptions for logging, it is well-known to install permanently one or preferably several sources with different offsets and/or azimuths in relation to the well, as described for example in patent French Patent-2,728,973.

Onshore, the source can be readily placed in contact with the ground or at the bottom of a cased hole deep enough for the source to be in contact with the formation below the weathered layer (WZ). Several independent sources coupled with the ground with different offsets in relation to the well can be successively activated for each position of the VSP logging tool.

Offshore, in order to carry out similar multi-offset, multi-azimuth VSP type exploration sessions, it is well-known to tow an immersed impulsive source (air, water or explosive gun, marine vibrator, etc.), to displace it in a zone around the well to a succession of "shooting" positions and to carry out, in each one of them, a succession of emission-reception cycles. It is clear that the duration of these interposed acquisition sessions is therefore considerably longer. It is faster and obviously much more expensive to use several workboats each towing a marine source and to trigger them in sequence for each position of the logging tool. Prospecting methods using towed immersed sources suffer from a common drawback. In fact, it is not possible to repeat exactly the same geometry of the emission-reception system from one exploration session to the next notably because of the ocean currents which contribute to changing the effective positions occupied by the source during the shots. The same uncertainty also exists for boats that are not equipped with dynamic positioning means allowing to stabilizing the position of the source.

SUMMARY OF THE INVENTION

A device designed for seismic exploration of an underwater formation according to the invention allows operations of monitoring of an underwater zone to be readily and rapidly carried out.

The method and the device of the invention has applications in many fields, notably in the field of seismic exploration or monitoring of an underwater formation such as a reservoir for example.

The device comprises seismic wave reception devices designed to be coupled with the formation, at least one self-contained emission unit immersible at the bottom of a water body combining at least one source of seismic waves suited to be directly pressed against the surface of the bottom, a local energy storage which supplies the at least one source it, a surface central station laterally distant from a point of immersion of each self-contained emission unit, a multifunction connection connecting each self-contained emission unit to a surface relay unit provided with bidirectional communication with the central station, suited for transmission of control signals triggering each source and of synchronization signals emitted from each emission unit.

The device preferably comprises a device associated with each self-contained emission unit allowing location of the position thereof at the bottom of the water body.

According to an embodiment of the invention, the device comprises at least one self-contained emission unit including several elastic wave sources supplied with fluid under pressure, the local energy storage comprises tanks for the fluid under pressure, and the multifunction connection, providing connection with the surface relay unit, comprising a hydraulic line connected to the tanks and control signal transmission and feeder lines.

The communication connection comprises for example a transmission set including for example a first module on the central control installation and a second module on each relay unit. each being associated with a radio emission-reception antenna.

According to an embodiment, the elastic wave reception means comprise at least one seismic receiver lowered in a well that can be associated with a well drill string, notably in the neighborhood of the drill bit or of stabilizers, so that it can be acoustically coupled to a formation.

According to another embodiment of the invention, the elastic wave reception device comprises at least one seismic receiver in contact with the bottom of the water body.

The method designed for seismic exploration of an underwater formation according to the invention comprises positioning, at the bottom of a water body, at least one self-contained emission unit comprising at least one seismic wave source suited to directly contact-and against the surface of the bottom, local energy storage for supplying the wave source, a multifunction connection connecting each self-contained emission unit to a surface relay unit provided with a communication device communicating with a central station, installation of seismic wave receivers in at least one well drilled in the formation from a production platform, determination of the position of each emission unit in relation to the production platform and carrying-out of cycles of seismic monitoring of the underground formation with periodic triggering of each source from the central station, and acquisition of the signals picked up by the receivers in response to the waves received, reflected by the discontinuities of the underground formation.

The method of the invention comprises positioning, at the bottom of the water body, several self-contained emission units in different azimuth and offset positions in relation to the central production platform, and carrying out cycles of acquisition of the signals picked up by the receivers in response to the triggering of the various emission units successively.

The method of the invention further comprises associating at least one receiver with a well drill string in the neighborhood of a drill bit and/or of a stabilizer of the string, and carrying out seismic prospecting operations with triggering of at least one seismic source and reception of the waves reflected by the formation, during instants when the drill string is motionless and in close contact with the formations surrounding the well.

Such a coupling is for example obtained by applying a moderate weight to the drill string that pushes the bit against the hole bottom and presses the stabilizers positioned at intervals along the string against the walls.

The method of the invention further comprises using receivers coupled with the bottom of the water mass and carrying out seismic prospecting operations with triggering of at least one seismic source and reception of the waves reflected by the formation.

The method of the invention further comprises displacing a single workboat to each of the surface relay units for control and energy supply of each emission unit, then removal and recovery thereof after use.

Such a permanent source layout has many advantages. A single workboat is sufficient to immerse the emission units successively in well-located spots corresponding to offsets and azimuths selected in relation to the well, and to provide periodic energy supply and maintenance. Each emission unit has its own energy reserve and can therefore be triggered any time by remote control. The seismic acquisition sessions with successive triggering of the various sources and reception by seismic receivers at various depths in the well can be carried out rapidly. The site production interruptions required for these seismic sessions are consequently shorter, which reduces their economic effect. This allows more flexibility when programming heavy seismic monitoring sessions in wells.

The emission devices can be readily installed offshore or in littoral zones, or in boggy zones which are difficult to get to access. In combination with a multilevel reception device in a well, an economical option is provided in all the cases where an alternative "walk-away" type VSP seismic method is considered to be too costly.

The emission device simultaneously affords a high emitting power, ease of operation, robustness, speed in operation and perfect repeatability, since the position of the emission units at the bottom is well-known and unchanging. In this respect, it is particularly well-suited for VSP prospecting operations while drilling, which require one or more sources continuously available throughout drilling operations.

BRIEF DESCRIPTION OF THE DRAWINGS

Other features and advantages of the method according to the invention will be clear from reading the description hereafter of a non limitative embodiment example, with reference to the accompanying drawings wherein.

DETAILED DESCRIPTION OF THE PREFERRED EMBODIMENTS OF THE INVENTION

Figure 1:
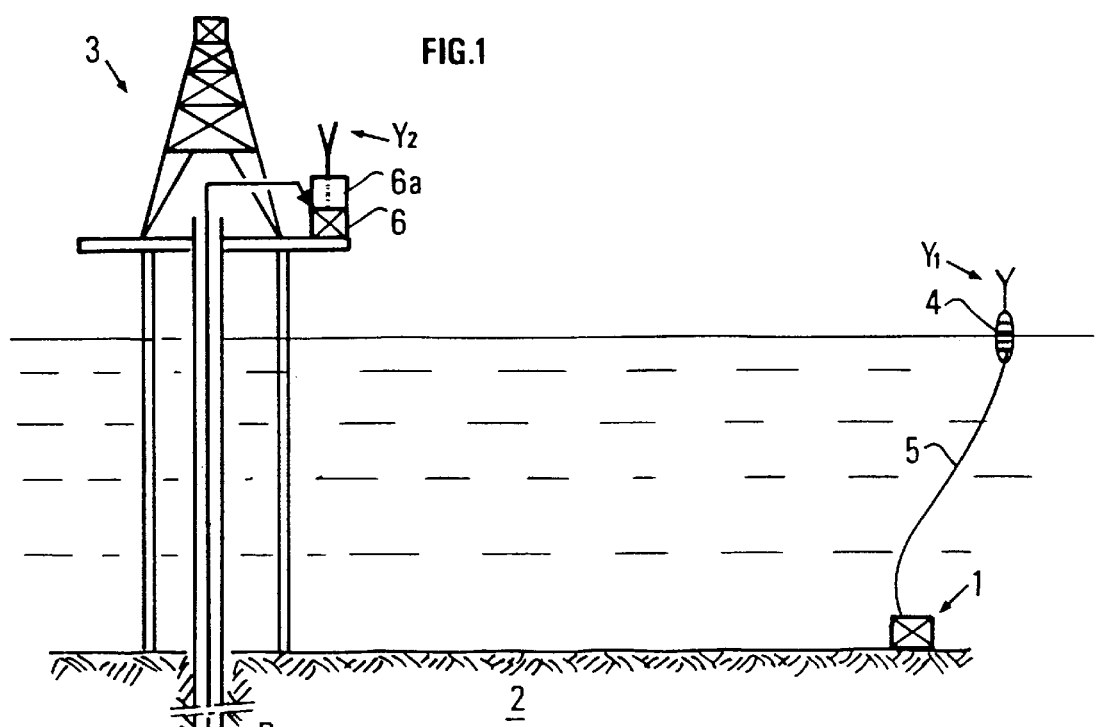
FIG. 1 diagrammatically shows a self-contained emission unit permanently immersed in the neighborhood of an offshore drilling or production platform, FIG. 2 diagrammatically shows a self-contained emission unit comprising several air guns, and FIG. 3 diagrammatically shows the positioning of one or more elastic wave receivers along a drill string in the neighborhood of the bit or of stabilizers in this string.

A device in accordance with the invention comprises one or more emission units 1 placed in contact with an underwater formation 2 to be explored, such as a reservoir containing hydrocarbons for example. This emission unit 1 is positioned on the bottom in a zone surrounding a development station such as a drilling or a production platform 3, above a well drilled through formation 2. A set of seismic receivers R1, R2, . . . , Rn, such as multi-axis geophones for example and/or accelerometers and/or hydrophones, is lowered in this well.

Each emission unit is connected to a surface buoy 4 by a multifunction cable 5. A transmission system connects each buoy 4 to a control station 6 on surface installation 3. This system comprises two modules, the first one 6a being placed in control station 6, the second module 4a being placed in each buoy 4 and communicating with the first one by radio link by means of antennas Y1, Y2 for example.

Figure 2:
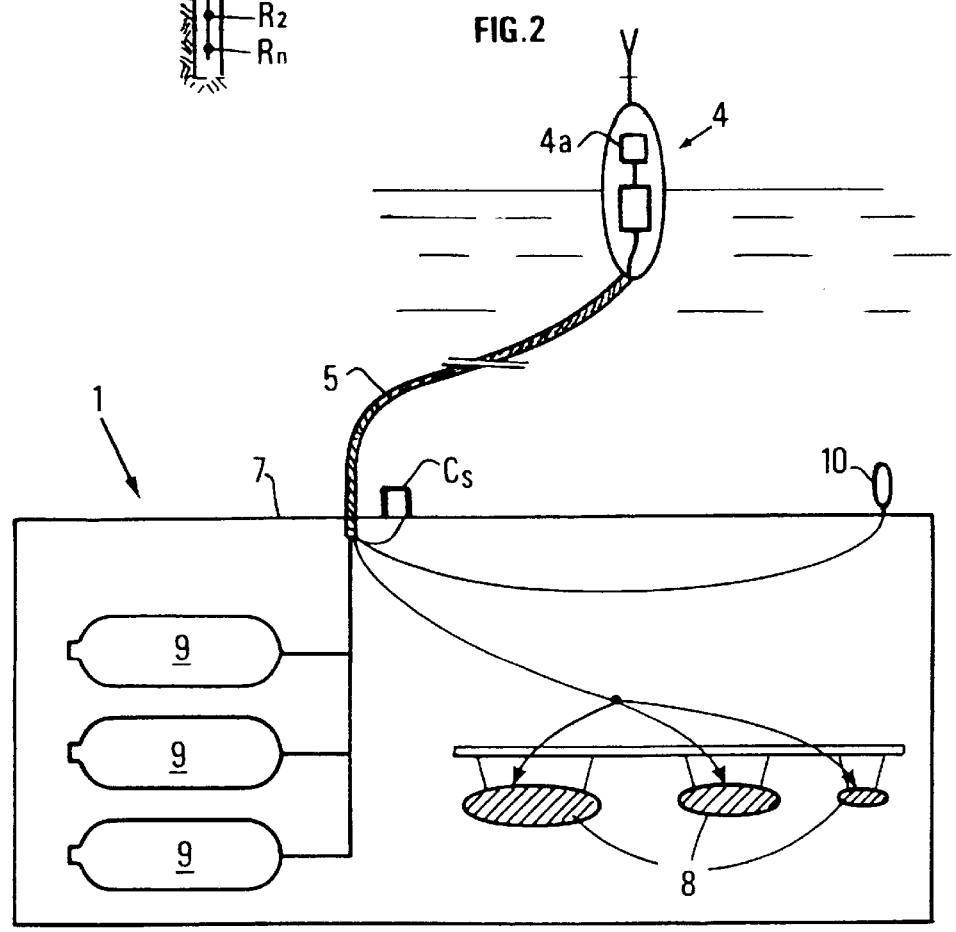

Each emission unit 1 comprises (FIG. 2) a rigid frame 7 supporting one or more elastic wave sources 8 and an energy supply 9 for these sources. Impulsive sources such as air guns can for example be used and a supply 9 comprise in this case a set of gas cylinders. Solenoid valves (not shown) respectively connect the various sources to the gas cylinders.

The multifunction cable (not shown in detail in FIG. 1) comprises a traction rope, an electric feeder cable, a first transmission line designed for transfer of the "fire" order via radio buoy 4 to subsea unit 1, a second line designed for transmission to control station 6, via radio buoy 4, of the signal commonly referred to as TB (Time Break) defining the effective instant at which each source is triggered. Another line allows transfer to the electronics on the buoy of the signals measuring the compressed air pressure in the feed circuits of sources 8, delivered by an associated manometer. Yet another line serves for transmission to control station 6, via radio buoy 4, of the seismic signal emitted by the source as it is triggered, which is received by a nearby pickup $C_S$. Cable 5 also comprises a line connecting gas cylinders 9 to an injection connection on the buoy, which allows a workboat to periodically link up with the buoy in order to refill the gas cylinders.

An acoustic transponder 10 permits location of the position of each emission unit 1 in relation to stationary installation 3 which is fastened to each frame 7.

Each source 8 can conventionally consist of a battery of guns of a well-known type, of similar or different characteristics, which are activated so as to minimize certain parasitic effects such as the multiples due to the resonances of the air bubbles released by air guns for example, and to increase the emitting power.

A control system such as that described for example in U.S. Pat. Nos. 5,184,329 and 5,200,927 and FR-2,664,064 (U.S. Pat. No. 5,200,927) can be used in combination with a radio link in order to control the triggering operations for each emission unit.

Each seismic receiver comprises for example a mono-axis and preferably a multi-axis pickup such as a triphone. Receivers R1, R2, . . . , Rn can be housed for example in one or more well sondes lowered into the well from station 3 at the end of an electrocarrying cable, that are pressed against the walls by the opening of anchor arms, as described in U.S. Pat. No. 5,243,337 of the Assignee. They can also be coupled with the formations surrounding the well according to one of the techniques described for example in U.S. Pat. Nos. 4,775,009, 5,181,565, 5,243,562 of the Assignee.

One or more receivers R1–n can also be placed in a drill string 11 in close proximity to bit 12 and/or stabilizers 13 of a well-known type, conventionally interposed along the string, so as to guarantee the best possible coupling of these receivers with the surrounding formations. They can be connected to control station 6 on platform 3 (FIG. 1) by a transmission line as described for example in French Patent 2,729,708 of the Assignee.

According to another embodiment, the seismic wave reception device has receivers in one or more sondes lowered into the well at the end of the cable.

When several emission units are distributed around central platform 3, with well-defined offsets and azimuths in relation thereto, triggering of the various emission units 1 is controlled from central station 6 and the waves received by the various receivers, either permanently installed in the well, associated with tools movable in the well or with a drill string, are recorded upon each triggering.

In cases where receivers R1–n are associated with a drill string, the seismic emission-reception cycles are carried out during drilling interruptions. For example drill pipe addition time intervals are used during which the bit is motionless at the bottom of the hole and the drill string is most often in close contact with the walls of the well at many points. In order to obtain proper coupling, the drill string is preferably pushed down in order to press the bit properly against the bottom of the hole and, under the effect of a slight buckling, to tightly press the stabilizers against the walls of the well.

The volume and the mass of each emission unit 1 are relatively low, so that a single workboat can install them successively at the various laying points selected, control the good working order thereof, and collect them once all the planned monitoring operations are complete.

An embodiment of an emission unit with one or more air guns has been described. However, the air guns can be replaced by sources of another type, the local energy storage being suited to the source type used.

Similarly, embodiments where reception means R1–Rn are preferably installed in a well have been described. Receivers coupled with the formation and placed for example in contact with the bottom of the water mass can also be used without departing from the scope of the invention.

What is claimed is:

1. A device for use in seismic exploration of an underwater formation, comprising:
   at least one seismic wave reception device coupled with the formation;
   at least one emission unit, each emission unit comprising at least one seismic source which directly contacts a bottom surface of a water body to directly couple seismic waves from each seismic source to the underground formation;
   an associated local energy storage which supplies energy to the at least one seismic source;
   a surface central station positioned laterally from a point of immersion of each emission unit in the water body;
   a multifunction connection which connects each emission unit to a surface relay unit; and
   a communication system connecting each surface relay unit to the surface central station which transmits control signals and other signals between each emission unit and the surface central central station.

2. A device as claimed in claim 1 further comprising:
   a position locating device associated with each unit which provides a location of each emission unit at the bottom surface of the water body relative to the surface central station.

3. A device as claimed in claim 1 further comprising:
   each emission unit is self-contained and the at least one seismic source is supplied with fluid under pressure;
   the associated local energy storage comprises at least one tank storing fluid under pressure which is coupled to the at least one seismic source; and wherein
   multifunction connection comprises a hydraulic line connected to the tanks, an electric feeder and control signal transmission lines.

4. A device as claimed in claim 2 further comprising:
   each emission unit is self-contained and the at least one seismic source is supplied with fluid under pressure;
   the associated local energy storage comprises at least one tank storing fluid under pressure which is coupled to the at least one seismic source; and wherein
   multifunction connection comprises a hydraulic line connected to the tanks, an electric feeder and control signal transmission lines.

5. A device as claimed in claim 1 wherein:
   the communication system comprises a transmission unit including a first module at the central station and a second module at each relay unit and a radio antenna associated with each module.

6. A device as claimed in claim 2 wherein:
   the communication system comprises a transmission unit including a first module at the central station and a second module at each relay unit and a radio antenna associated with each module.

7. A device as claimed in claim 1, wherein:
   each seismic wave reception device comprises at least one seismic receiver lowered in a well.

8. A device as claimed in claim 2, wherein:
   each seismic wave reception device comprises at least one seismic receiver lowered in a well.

9. A device as claimed in claim 7 wherein:
   each seismic reception device is acoustically coupled with the formation.

10. A device as claimed in claim 8 wherein:
    each seismic reception device is acoustically coupled with the formation.

11. A device as claimed in claim 9 wherein:
    at least one seismic receiver is disposed adjacent to a drill bit.

12. A device as claimed in claim 10 wherein:
    at least one seismic receiver is disposed adjacent to a drill bit.

13. A device as claimed in claim 9 wherein:
    at least one seismic receiver is adjacent to at least one stabilizer interposed on drill string.

14. A device as claimed in claim 10 wherein:
    at least one seismic receiver is adjacent to at least one stabilizer interposed on drill string.

15. A device as claimed in claim 11 wherein:
    at least one seismic receiver is adjacent to at least one stabilizer interposed on drill string.

16. A device as claimed in claim 12 wherein:
    at least one seismic receiver is adjacent to at least one stabilizer interposed on drill string.

17. A device as claimed in claim 1, wherein:
    the seismic wave reception device comprises at least one seismic receiver coupled with the bottom of the water body.

18. A method of seismic exploration of an underground formation comprising:
    positioning, at a bottom of a water body, at least one emission unit comprising at least one seismic wave source which directly contacts a surface of the bottom of the water body to directly coupled seismic waves from each seismic source to the underground formation, a local energy storage which supplies energy to the at least one seismic wave source, a multifunction connection which connects each emission unit to a surface relay unit and a communication system which provides communications between a central control station and each emission unit;

installing seismic wave receivers in at least one well drilled in the formation from a production platform;

determining a position of each emission unit in relation to the production platform; and carrying out cycles of seismic monitoring of the underground formation with periodic triggering of each seismic source from the central station to directly coupled seismic waves from each seismic source to the formation and receiving signals picked up by receivers in response to the waves produced by the seismic source which are reflected by discontinuities of the underground formation.

19. A method as claimed in claim 18 further comprising:

positioning, at the bottom of the water body, emission units in varied azimuth and offset positions in relation to the central production platform; and carrying out cycles of seismic acquisition of the signals picked up by the seismic receivers in response to triggering of the emission units.

20. A method as claimed in claim 18, comprising:

associating at least one receiver of the seismic wave receivers with a drill string in proximity to at least one of a drill bit or a stabilizer of the string; and carrying out seismic prospecting operations by triggering at least one seismic source and receiving waves reflected by the underground information when the drill string is motionless coupled through walls of the well to the associated at least one receiver.

21. A method as claimed in claim 18 further comprising:

coupling the receivers with the bottom of the water body; and carrying out seismic prospecting operations with triggering of at least one seismic source and receiving waves reflected by the underground formation with the coupled receivers.

22. A method as claimed in claim 19 further comprising:

coupling the receivers with the bottom of the water body; and carrying out seismic prospecting operations with triggering of at least one seismic source and receiving waves reflected by the underground formation with the coupled receivers.

23. A method as claimed in claim 20 further comprising:

coupling the receivers with the bottom of the water body; and carrying out seismic prospecting operations with triggering of at least one seismic source and receiving waves reflected by the underground formation with the coupled receivers.

24. A method as claimed in claim 21 further comprising:

coupling the receivers with the bottom of the water body; and carrying out seismic prospecting operations with triggering of at least one seismic source and receiving waves reflected by the underground formation with the coupled receivers.

25. A method as claimed in claim 18, comprising:

periodically displacing a work boat to each surface relay unit;

controlling each surface relay unit; and providing energy to each emission unit.

* * * * *